(12) United States Patent
Gokhman (10) Patent No.: US 6,918,744 B2
(45) Date of Patent: Jul. 19, 2005

(54) HYDRAULIC TURBINE AND EXIT STAY APPARATUS THEREFOR

(76) Inventor: Alexander Gokhman, 3031 Noriega St., San Francisco, CA (US) 94122

( * ) Notice: Subject to any disclaimer, the term of this patent is extended or adjusted under 35 U.S.C. 154(b) by 0 days.

(21) Appl. No.: 10/224,442

(22) Filed: Aug. 21, 2002

(65) Prior Publication Data

US 2004/0037698 A1 Feb. 26, 2004

(51) Int. Cl.$^7$ .................................................. F03B 3/16
(52) U.S. Cl. ..................... 415/161; 415/211.2; 415/914
(58) Field of Search ............................. 415/211.2, 914, 415/161, 164, 182.1, 208.1, 208.2

(56) References Cited

U.S. PATENT DOCUMENTS

| | | | |
|---|---|---|---|
| 1,748,768 A | * | 2/1930 | Reinhard .................. 415/211.2 |
| 5,261,787 A | * | 11/1993 | Morgunov .................. 415/914 |
| 5,871,331 A | * | 2/1999 | Itabashi et al. ............. 415/150 |

FOREIGN PATENT DOCUMENTS

JP        52066128 A  *  6/1977  ............. F03B/3/00

* cited by examiner

Primary Examiner—Edward K. Look
Assistant Examiner—Richard A. Edgar (57) ABSTRACT

The invention is an Exit Stay Apparatus for Francis and propeller hydraulic turbines. The purpose of the invention is to eliminate the loss of turbine efficiency and strong pulsations in draft tube caused by the axial circular vortex in all turbine operating regimes other than optimum without a noticeable decrease in maximum efficiency. It can be incorporated not only into newly fabricated hydraulic turbines, but also retrofitted into existing turbines. The Exit Stay Apparatus has a crown and exit stay vanes secured to the the crown. When installed in the turbine, the exit stay crown is located immediately after the runner crown, which is truncated at the bottom by a plane perpendicular to the central axis of the turbine. The exit stay crown together with the truncated runner crown forms water passages after the runner blade crown profile exit. The exit stay vanes are arranged in a circular array around the turbine axis, located after the runner blades, and attached at the periphery either to the draft tube cone or to an exit stay flange secured to the turbine discharge ring and to the draft tube cone.

19 Claims, 7 Drawing Sheets

HYDRAULIC TURBINE AND EXIT STAY APPARATUS THEREFOR

BACKGROUND OF THE INVENTION

This invention relates to reaction hydraulic turbines. More specifically, the invention relates to reaction hydraulic turbines with a radial intake having a spiral casing with inlet stay vanes, a radial guide gate apparatus with wicket gates, either a mixed flow runner or an axial flow runner with runner blades secured to the runner crown, and a draft tube with a cone and an elbow.

At any hydroelectric plant the water level in the upper reservoir varies in time. The upper reservoir level depends on the flow of the river on which the plant is situated and on the seasonal demand of the power grid supplied by the plant. Turbine head, denoted by $H_t$, varies along with the upper reservoir level.

Power output of a turbine, denoted by $P_t$, is continually adjusted to meet the immediate demand of the power grid. Thus, $P_t$ is also a time dependent variable. Power output of a reaction hydraulic turbine is adjusted by changing the discharge angle of the wicket gates of the guide gate apparatus.

Power output of a turbine $P_t$ (kW) is given by the following formula:

$$P_t = g\eta_t Q_t H_t \qquad (1)$$

where:

$\eta_t$ is the efficiency of the turbine, $H_t$ is the turbine head (m), $Q_t$ is the flow rate through the turbine (m³/sec), and g is gravitational acceleration (g=9.81 m/sec²).

Formula (1) shows that, for a fixed value of $H_t$ power output $P_t$ is proportional to the flow rate $Q_t$. The flow rate of the turbine can be adjusted by varying the wicket gate discharge angle $\alpha_1$. The wicket gate discharge angle is the angle of a wicket gate exit element relative to the circumference of the turbine. The flow rate of the turbine is an increasing function of the wicket gate discharge angle.

The following considerations involve the concept of an elementary turbine. The flow inside the turbine passages is partitioned into thin laminated by axisymmetric stream surfaces of averaged meridional flow. An elementary turbine is the part of a turbine located in one such thin lamina.

For an elementary turbine the difference between the values of whirl at the wicket gate exit and at the runner blade exit, denoted by $\Delta(V_u R)$, is given by Euler's equation:

$$\Delta(V_u R) = \frac{g\eta_t H_t}{\omega} \qquad (2)$$

where $\omega$ is the angular velocity of the turbine ($\omega=\pi N/30$, where N is the rotation rate of the turbine in rpm). Meanwhile, for the i-th elementary turbine, the value of whirl at the wicket gate exit, denoted by $[(V_u R)_1]_i$, is given by $$[(V_u R)_1]_i = [(V_m R)_1]_i \cot \alpha_1 \qquad (3)$$

where $[(V_m R)_1]_i$ is the moment of velocity meridional component with respect the turbine axis at the wicket gate exit edge. Combining (2) and (3) one obtains the formula for whirl at the runner blade trailing edge for the i-th elementary turbine, denoted by $[(V_u R)_2]_i$.

$$[(V_u R)_2]_i = [(V_m R)_1]_i \cot\alpha_1 - \frac{g\eta_t H_t}{\omega} \qquad (4)$$

Formula (4) shows that for each elementary turbine the value of whirl at the runner blade exit varies with the values of $P_t$ (via $\alpha_1$) and $H_t$. In particular, whirl does not necessarily vanish at the runner crown. If $(V_u R)_2 \neq 0$ at the runner crown, an axial circular vortex forms at the runner crown tip. Otherwise $V_u = (V_u R)_2/R$ would tend to infinity as $R \to 0$ leading to a contradiction (see L. M. Milne-Thomson, *Theoretical Hydrodynamics*, Macmillan [1960]).

The axial circular vortex core ($0 \leq R \leq R_{cv}$, where $R_{cv}$ is the core radius) rotates as a solid body with velocity:

$$V_u = \frac{\omega_{cv} R}{2} \qquad (5)$$

where $\omega_{cv}$ is distributed vorticity inside the core. The flow outside the axial circular vortex ($R > R_{cu}$) is similar to the flow after the runner blade trailing edge and has the same values of $[(V_u R)_2]_i$, for the i-th elementary turbine. The axial circular vortex produces strong pulsations in draft tube. It ultimately dissipates due to the viscosity of water, causing a significant loss of head i turbine what results in a decrease of turbine efficiency given by:

$$\Delta\eta_{cv} = \frac{(V_u R)_{2cr}^2}{2g R_{dt}^2 H_t} \qquad (6)$$

where $(V_u R)_{2cr}$ is whirl at the runner blade trailing edge in the elementary turbine adjacent to the runner crown and $R_{dt}$ is the draft tube cone inlet radius (see G. I. Topazh, *Computation of Integral Hydraulic Indicators of Hydromachines*, Leningrad [1989]).

In order to avoid strong pulsation in draft tube and a loss efficiency due to the axial circular vortex in the design regime, turbines are designed to have $(V_u R)_{2cr}=0$ for the design values of power output $(P_t)_d$ and head $(H_t)_d$. However, with variation of $H_t$ and especially with variation of $P_t$, there is a significant loss of efficiency due to the axial circular vortex in prior art reaction hydraulic turbines with runner blades secured to the runner crown and having a draft tube with an elbow. For example, for a turbine with maximum efficiency $\eta_{max}=0.93$, when $H_t=0.80\,(H_t)_d$ and $P_5=0.50\,(P_t)_d$, one may compute using (6) an efficiency loss of $\Delta\eta_{cu}=0.08$ (i.e. 8%).

At this point Moody inventions (U.S. Pat. Nos. 1,769,887, July 1930, 1,848,738 March 1932, 1,848,739 March 1932, and 1,929,099, October 1933) should be mentioned. In all four these inventions Moody introduced draft tubes without an elbow and a horizontal diffuser.

Inside all Moody draft tubes there is a stationary pole mounted at the bottom. The pole is a geometrical continuation of the runner crown. The efficiency loss due to the axial circular vortex is eliminated in a reaction hydraulic turbine with runner blades secured to the runner crown and having one of Moody draft tubes. However, Moody draft tubes are inferior to the ones with an elbow and a horizontal diffuser and the turbine built with one of Moody draft tubes would have smaller efficiency at optimal operating regime.

For this reason turbines with Moody draft tubes with a stationary pole are not utilized at hydroelectric power plants.

BRIEF SUMMARY OF THE INVENTION

The present invention discloses an exit stay apparatus for a hydraulic turbine with runner blades secured to the runner crown. The purpose of the invention is to eliminate the loss of turbine efficiency and strong pulsations in draft tube caused by the axial circular vortex in all turbine operating regimes other than optimum without a noticeable decrease in maximum efficiency. The proposed exit stay apparatus can be incorporated not only into newly fabricated hydraulic turbines, but also retrofitted into existing Francis and propeller turbines.

The exit stay apparatus has an exit stay crown and exit stay vanes secured to the exit stay crown. When installed in the turbine, the exit stay crown is located immediately after the runner crown, which is truncated at the bottom by a plane perpendicular to the central axis of the turbine. The exit stay crown has the shape of a cup and together with the truncated runner crown forms water passages after the runner blade crown profile exit. The exit stay vanes are (a) arranged in a circular array around the turbine axis,
(b) located after the runner blades, and
(c) secured at the periphery either to the draft tube cone or to an exit stay flange secured to the turbine discharge ring and to the draft tube cone.

Inlet edges of the exit vanes are located near the runner blade exit edges. For each elementary turbine the distance between the runner blade exit edge and the exit stay vane inlet edge is preferably not smaller than the distance between two adjacent runner blade exit edges along the circumference, denoted by T. This is in order to avoid strong pulsations at the exit stay vane inlet edges. The solidity of the cascade formed by profiles of said exit stay vans is $(L/T)_{ev}$, where L is the length of the cascade profile. The solidity of the cascade varies from values greater than 1.1 at the exit stay crown to relatively small values at the periphery. The value of $(L/T)_{ev}$ at the periphery and the maximum relative thickness for the exit vane profiles along the exit vane span are determined from structural considerations.

The exit stay vane profiles are subsets of the axisymmetric stream surfaces bounding the elementary turbines. The profile contours are the lines of intersection of said axisymmetric stream surfaces with exit vane bounding surface.

Let $\beta_i$ and $\beta_e$ denote respectively the angles of inlet and exit profile elements relative to the turbine circumference. Along its leading edge each profile the inlet angle $\beta_i$ is given by $$\tan\beta_i = \frac{(V_m)_{opt}}{(V_u)_{opt}} \quad (7)$$

where $(V_m)_{opt}$ and $(V_u)_{opt}$ are meridional and circumferential components of velocity along the leading edge in the optimum operating regime of the turbine. The exit stay vane exit angle along its trailing edge is $\beta_e=90°$.

The geometrical shape of the exit stay vanes, described above, enables the exit stay apparatus to substantially decrease the loss of turbine efficiency in operational regimes other than optimum. In the optimum regime the inlet shock losses for all profiles along the exit vane span vanish. There are small losses due to friction at the stay vane cascades. These fraction losses are barely noticeable for the elementary turbines near the turbine axis, where $(L/T)_{ev}\approx1.0$, and are practically zero for the midstream and peripheral elementary trubines. Since the predominant portion of the flow passes through the midstream and peripheral elementary turbines, the impact of the additional friction losses caused by the exit stay apparatus on the maximum efficiency is not noticeable.

The solidity of the exit vane crown elementary turbine cascade is $(L/T)_{ev}>1.1$, therefore, for all operational regimes other than optimum the exit vane crown elementary turbine cascade redirects the flow to become meridional and eliminates the axial circular vortex. The loss of efficiency caused by this redirection constitutes a small fraction of the loss due to the axial circular vortex, since the redirection occurs at the inlet to the crown exit vane profile relatively big value of radius.

The solidity of the remaining exit vane apparatus elementary turbines is $(L/T)_{ev}<<1.0$. Partial redirection of the flow by the remaining exit vane apparatus elementary turbines cause a loss of efficiency much smaller than the recovery of efficiency due to the decrease in the value of whirl at the entrance of the draft tube cone. The partial redirection of the flow by the rest of the exit vane apparatus elementary turbines, having $(L/T)_{ev}<<1.0$, causes the loss of efficiency smaller than the recovery of efficiency cause by the decrease in the whirl at entrance to draft tube cone, since this redirection for each elementary turbine is done at bigger radius than its radius at draft tube cone entrance.

DETAILED DESCRIPTION OF THE INVENTION

Figure 1:
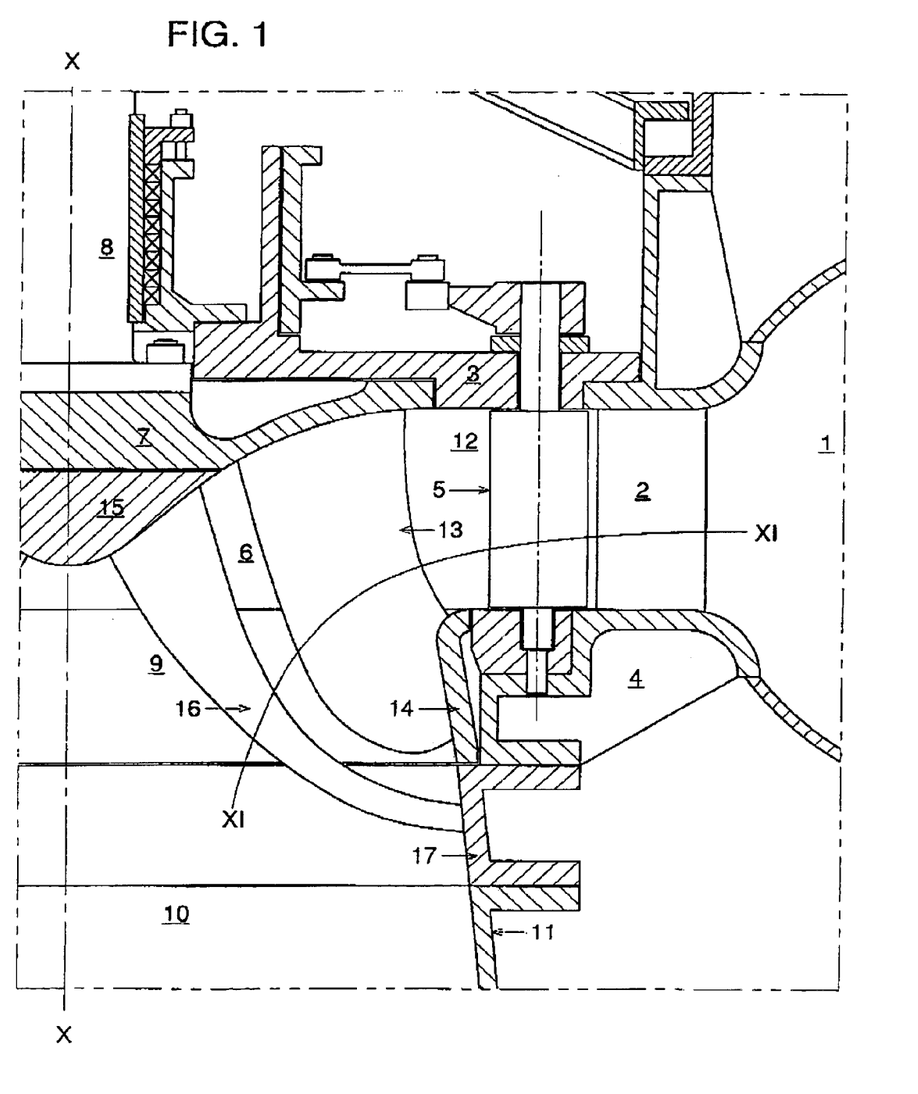
FIG. 1 is an elevation view, partially in cross-section, of a radial intake turbine with a a mixed flow runner having a periphery rim and with an exit stay apparatus having an exit stay flange.

Referring now to FIG. 1, a radial intake turbine installation is shown. The installation comprises a spiral casing 1 with radial stay vanes 2, upper head cover 3 and a discharge ring 4 both secured to the spiral casing 1, a guide gate apparatus 12 with radial wicket gates 5 pivotally secured to the head cover 3 and the discharge ring 4, a mixed flow runner 6 with a runner crown 7 secured to the turbine shaft 8, exit stay apparatus 9, and a draft tube 10 with draft tube cone 11 and a draft tube horizontal diffuser not shown in FIG. 1. Mixed-flow runner 6 together with shaft 8 rotates around the central axis X—X.

The power output of the turbine is regulated by radial wicket gates 5 which can be pivoted from a maximum open position to a closed position. The mixed flow runner 6 comprises a runner crown 7, turbine blades 13, and rim 14. Turbine blades 13 are secured to the runner crown 7 and to the rim 14. Rim 14 forms turbine water passages at the periphery (in the case of a propeller mixed flow runner the rim 14 is absent and turbine water passages at the periphery are formed by the discharge ring 4). The runner crown 7 is truncated by a plane perpendicular to central axis X—X. Exit stay apparatus 9 comprises exit stay crown 15, exit stay vanes 16, and exit stay flange 17. Plurality of exit stay vanes 16 are arranged in a circular array around the central axis X—X.

Exit stay vanes 16 are secured to the exit stay crown 15 and to the exit stay flange 17. Exit stay crown 15 is installed immediately under the truncated runner crown 7 and together with runner crown 7 forms the water passages, which in prior art turbines are formed solely the runner crown 7. Exit stay flange 17 is secured to the discharge ring 4 and to the draft tube cone 11. FIG. 1 also shows a stream surface of meridional flow XI—X.

To those skilled in the art it is clear that the turbine installation shown in FIG. 1 differs from prior art turbines by the presence of the exit stay apparatus 9.

The exit stay apparatus 9 is there to eliminate the loss of efficiency due to an axial circular vortex formed in the flow after runner crown of prior art turbines in operational regimes other than optimum.

Figure 2:
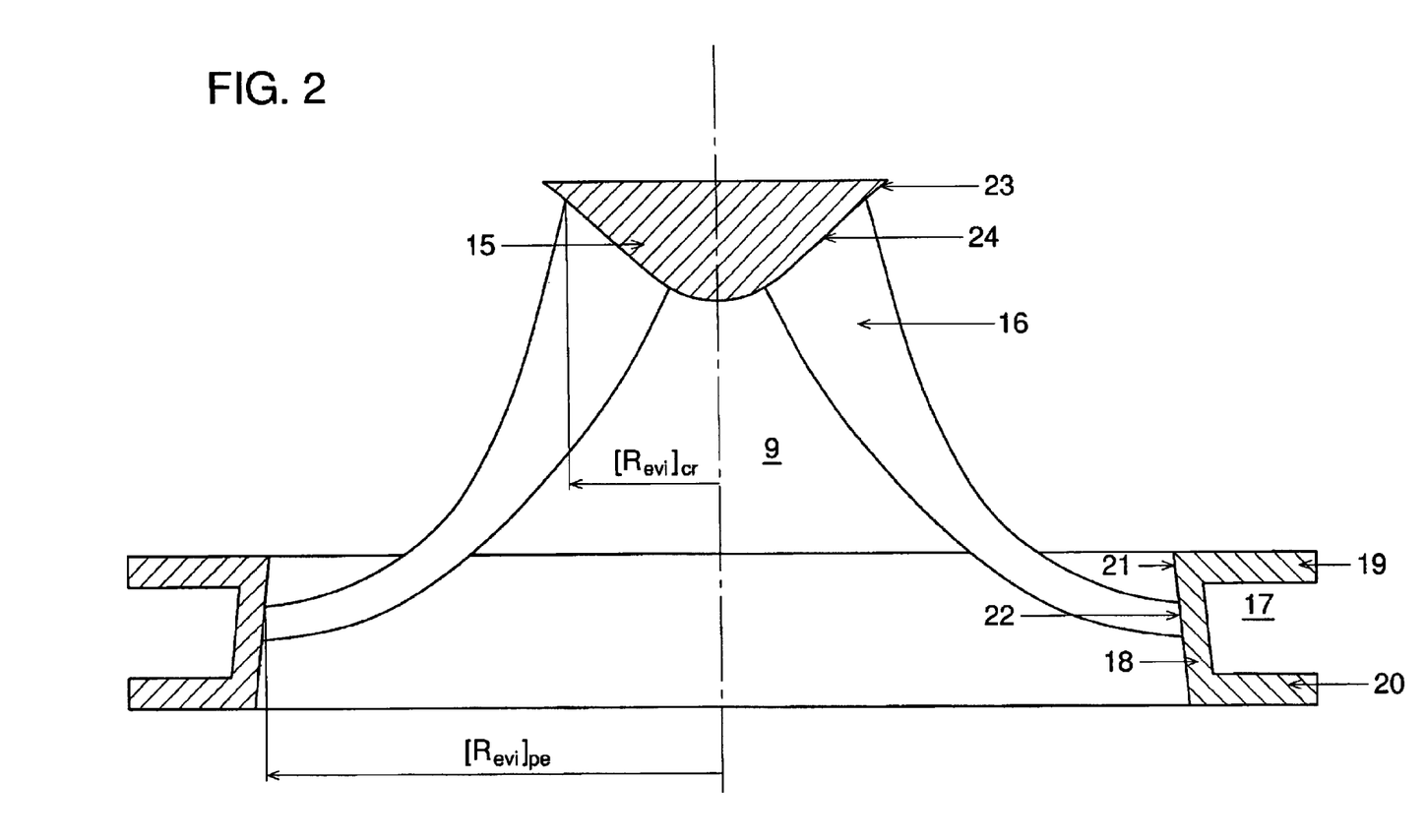
FIG. 2 is an elevation view, partially in cross-section, of an exit stay apparatus with an exit stay flange.

FIG. 2 shows an exit stay apparatus 9 with exit stay crown 15, exit stay vanes 16, and exit stay flange 17. Exit stay vanes 16, secured to exit stay crown 15 and to exit stay flange 17, are identical in shape and profiled along their spans with maximal profile length at exit stay crown 15 and with minimal profile length at exit stay flange 17. Exit stay crown 15 has the shape of a cup. The outer part 23 of exit stay crown 15 is secured to crown profiles 24 of exit stay vanes 16 and forms the water passages after the runner crown 7 of FIG. 1 when the exit stay apparatus 9 is installed in the turbine. Exit stay flange 17 comprises the side wall 18, upper ring 19, and lower ring 20. The inner part 21 of the side wall 18 is secured to peripheral profiles 22 of exit stay vanes 16 and forms the water passage at the periphery when the exit stay apparatus 9 is installed in the turbine. Upper ring 19 is secured to the discharging ring 4 of FIG. 1 and lower ring 20 is secured to the draft tube cone 11 of FIG. 1 when the exit stay apparatus 9 is installed in the turbine. FIG. 2 also shows inlet radii of crown profiles 24 and of peripheral profiles 22, denoted by $(R_{evi})_{cr}$ and $(R_{evi})_{pe}$ respectively.

The intersection of the stream surface XI—XI of FIG. 1 with exit stay vanes 16 gives a cascade of profiles.

Figure 3:
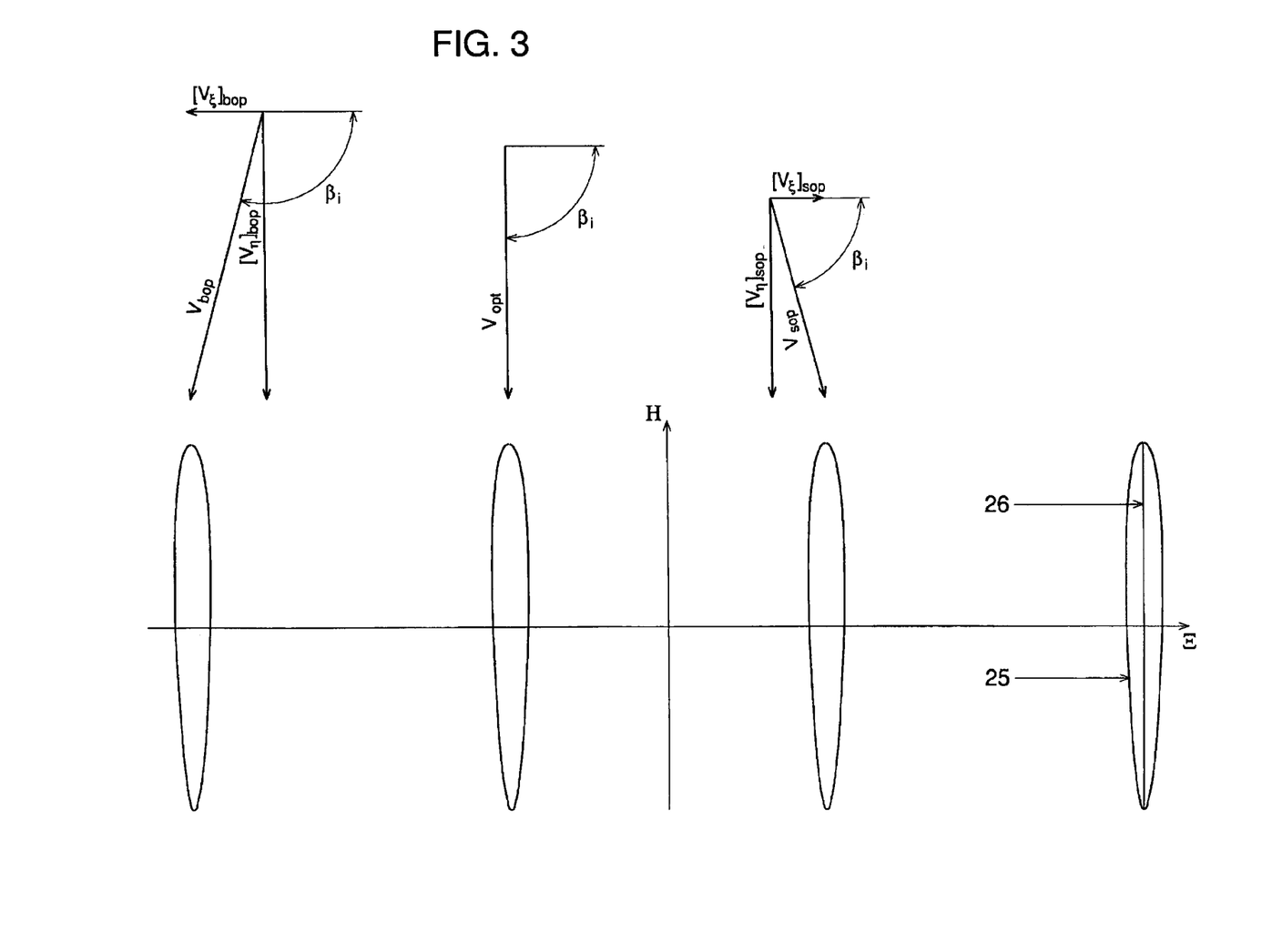
FIG. 3 is a straight cascade of profiles with absolute flow velocity diagrams for a turbine with a mixed-flow runner being a conformal mapping of the cascade of exit stay vane profiles at the exit stay crown, which is an intersection of the crown stream surface with the exit stay vanes in FIG. 2.
Figure 4:
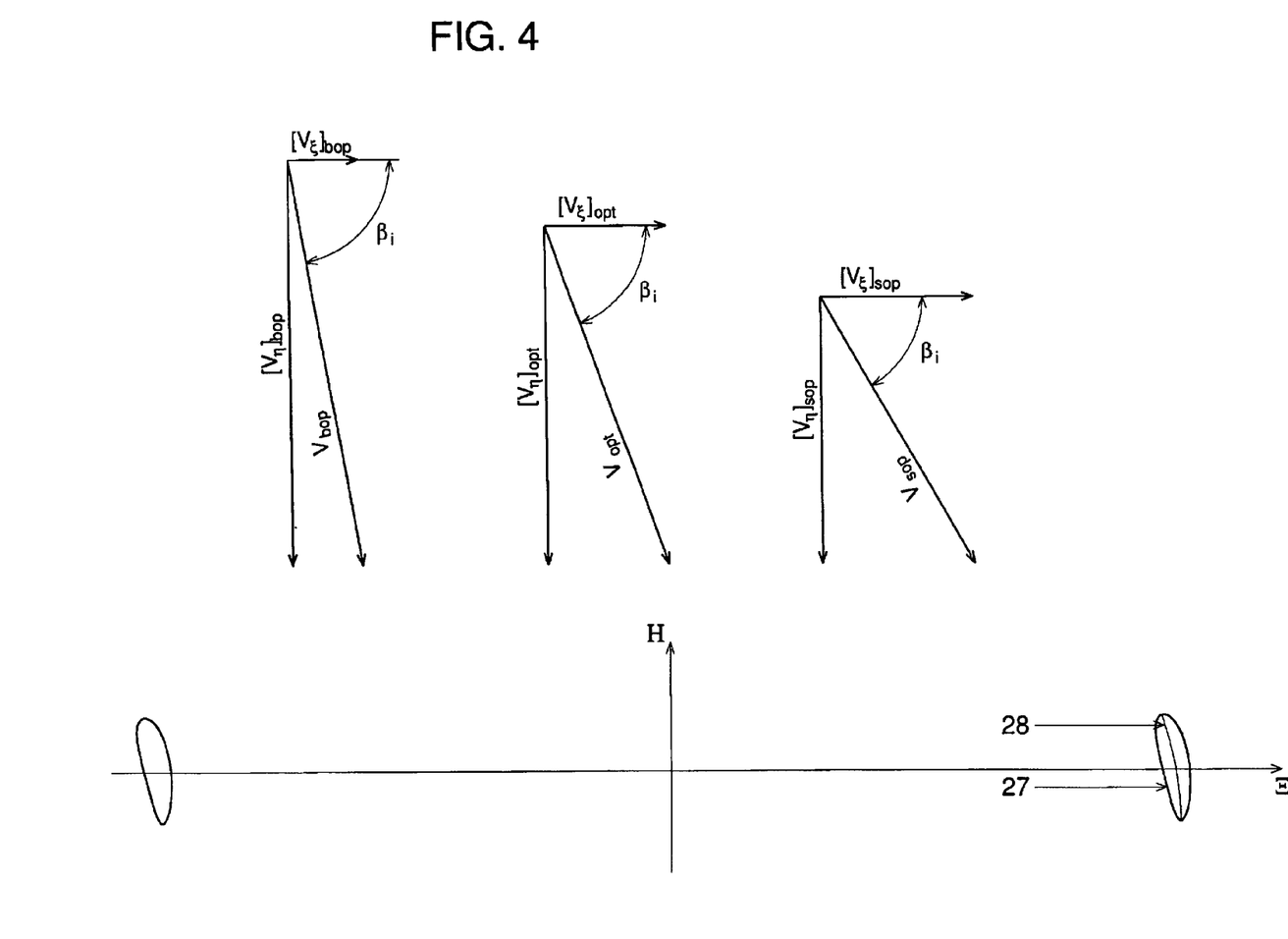
FIG. 4 is a straight cascade of profiles with absolute flow velocity diagrams for a conventional turbine with a mixed flow runner being a conformal mapping of the cascade of the exit stay vane profiles at the periphery, which is an intersection of the periphery stream surface with the exit stay vanes in FIG. 2.
Figure 5:
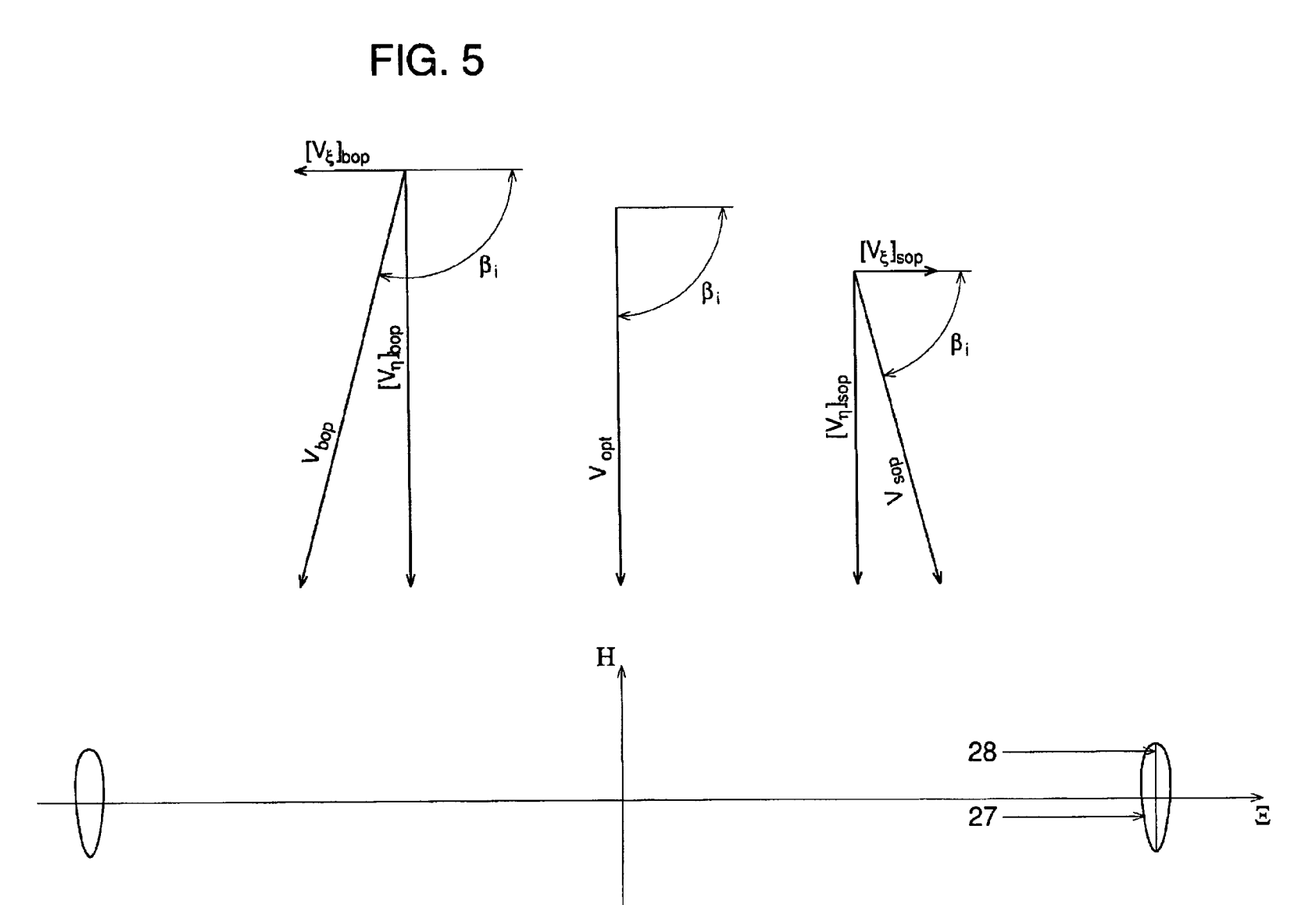
FIG. 5 is a straight cascade of profiles with absolute flow velocity diagrams for a Potential Flow turbine with a mixed flow runner being a conformal mapping of the cascade of exit stay vane profiles at the periphery, which is an intersection of the peripheral stream surface with the exit stay vanes in FIG. 2.

FIGS. 3–5 show planar images of such cascades under a conformal mapping given by $$\Xi = \Phi R_0 \quad (8)$$

$$H = \int_0^{l_s} \frac{R dl_s}{R_0} \quad (9)$$

$$V_\xi = \frac{R}{R_0} V_u \quad (10)$$

$$V_\eta = \frac{R}{R_0} V_m \quad (11)$$

where:

($\Xi$,H) are Cartesian coordinates in the image plane, (R,$\Phi$) are cylindrical coordinates of a point on the stream surface XI—XI, $l_s$ is length along a streamline of the stream surface XI—XI, $R_0$ is the radial coordinate of points on the stream surface XI—XI with $l_s$=0, and $V_\xi$ and $V_\eta$ are absolute velocity components in the image plane.

FIGS. 3–5 show conformal images of cascades of profiles of the exit stay apparatuses 9 of FIGS. 1 and 2 designed for a conventional turbine with a mixed flow runner and for a Potential Flow turbine with a mixed flow runner (U.S. Pat. No. 5,441,384, Aug. 1995). In the optimum operating regime both turbines have unit flow rate: $(Q_{11})_{opt}$=1.00 m³/sec and unit rotation rate: $(N_{11})_{opt}$=66.00 prm. The particular Potential Flow turbine which exit stay vane profiles shown in FIG. 3 and 5 was designed as a replacement of runner blades and wicket gates for the Boundary hydroelectric plant. It has the following design parameters: turbine flow rate $Q_t$=225.3 m³/sec, turbine head $H_t$=76.2 m, and runner diameter $D_t$=5.2 m. For both turbines the number of exit stay vanes 16 in the exit stay apparatus 9 of FIGS. 1 and 2 is $Z_{ev}$=6. An exit stay apparatus 9 must be designed with the following constrains along the spans of exit stay vanes 16: the whirl at the inlet to the profiles of exit stay apparatus 0 $(V_u R)_{evi}$ must equal the whirl at the blade trailing edge $(V_u R)_2$; the whirl at the exit of the profiles of the exit stay apparatus 9, $(V_u R)_{eve}$, must vanish. Thus, the exit elements of the profiles of the exit stay apparatus 9 must be meridional.

When the exit stay apparatus is retrofitted into Francis turbine with badly designed draft tube elbow the presence of the whirl at the periphery at inlet to the draft tube cone 10 of FIG. 1 is required in order to prevent the flow separation from the elbow wall. In that case the exit discharge angle from stay vane 16 of FIG. 2 gradually changes along vane span from 90° at the stay crown 15 to the value required by the whirl at periphery.

FIGS. 3–5 also show velocity vectors $V_i$ at the inlet to the profiles with components $(V_\xi)_i$ and $(V_\eta)_i$, and the angle $\beta_i$ between $V_i$ and O$\Xi$. The subscripts "opt", "sop", and "bop" to $V_i$, $(V_\xi)_i$, $(V_\eta)_i$, and $\beta_i$ mean respectively: for optimal power $(P_t)_{opt}$, for $P_t<(P_t)_{opt}$, and for $P_t>(P_t)_{opt}$.

FIG. 3 shows a planar cascade of profiles 25 which is a conformal image of the cascade formed by crown profiles 24 of FIG. 2 under the mapping (8–11) with $R_0=(R_{evi})_{cr}$. The profiles 25 are the same for conventional and Potential Flow turbines with middle lines 26 being straight line segments. This is because in the optimum operating regime the whirl at the inlet to the crown profiles 24 of FIG. 2, $(V_u R)_{2cr}$, vanishes for both types of turbine. In order to direct the flow along the meridional profile exit element and to completely eliminate whirl after the exit stay apparatus 9 at the exit stay crown 15, the solidity of planar cascade of profiles 25 must satisfy $(L/T)_{ev}>1.1$, where L is the length of the middle segment 26 and $T=(R_0\pi)/Z_{ev}$. As can be seen in FIG. 3: $(V_\xi)_{opt}$=0, $(V_\xi)_{bop}$<0, $(V_\xi)_{sop}$>0, $(\beta_i)_{opt}$=90°, $(\beta_i)_{bop}$>90°, and $(\beta_i)_{sop}$<90°.

FIG. 4 shows a planar cascade of profiles 27 which is a conformal image of the cascade formed by crown profiles 24 of FIG. 2 under the mapping (8–11) with $R_0=(R_{evi})_{pe}$. The middle lines 28 of profiles 27 are not straight line segments and at the inlet they have an angle relative to O$\Xi$ equal to $(\beta_i)_{opt}$. The solidity of the planar cascade of profiles 26 satisfies $(L/T)_{ev}<0.1$. For a conventional turbine in the optimum operational regime the whirl leaving the runner at the periphery satisfies $[(V_uR)_2]_{pe}>>0$, since $[(V_uR)_1]_{pe}=k\Delta(V_uR)$ with $2 \leq k \leq 4$. For a conventional turbine the whirl $[(V_uR)_2]_{pe}>0$ for all values of power $P_t$. As can be seen in FIG. 4: $(V_\xi)_{opt}>0$, $(V_\xi)_{bop}>0$ $(V_{86})_{sop}>0$, $(\beta_i)_{opt}<90°$, $(\beta_i)_{bop}<90°$, $(\beta_i)_{sop}<90°$, and $(\beta_i)_{sop}<(\beta_i)_{opt}<(\beta_i)_{bop}$.

FIG. 5 shows a planar cascade of profiles 27 for the Potential Flow turbine, which is a conformal image of the cascade formed by peripheral profiles 22 of FIG. 2 under the mapping (8–11) with $R_0=(R_{evi})_{pe}$. The middle lines 28 of profiles 27 are straight line segments, since for the Potential Flow turbine in optimum operating regime the whirl leaving the runner at the peripheral $[(V_uR)_2]_{pe}$ vanishes. The solidity of planar cascade of profiles 27 $(L/T)_{ev}<0.1$, just as for the conventional turbine in FIG. 4. As can be seen in FIG. 5: $(V_\xi)_{opt}=0$, $(V_\xi)_{bop}<0$, $(V_\xi)_{sop}>0$, $(V_\xi)_{opt}=90°$, $(\beta_i)_{bop}<90°$, $(\beta_i)_{sop}<90°$.

Figure 6:
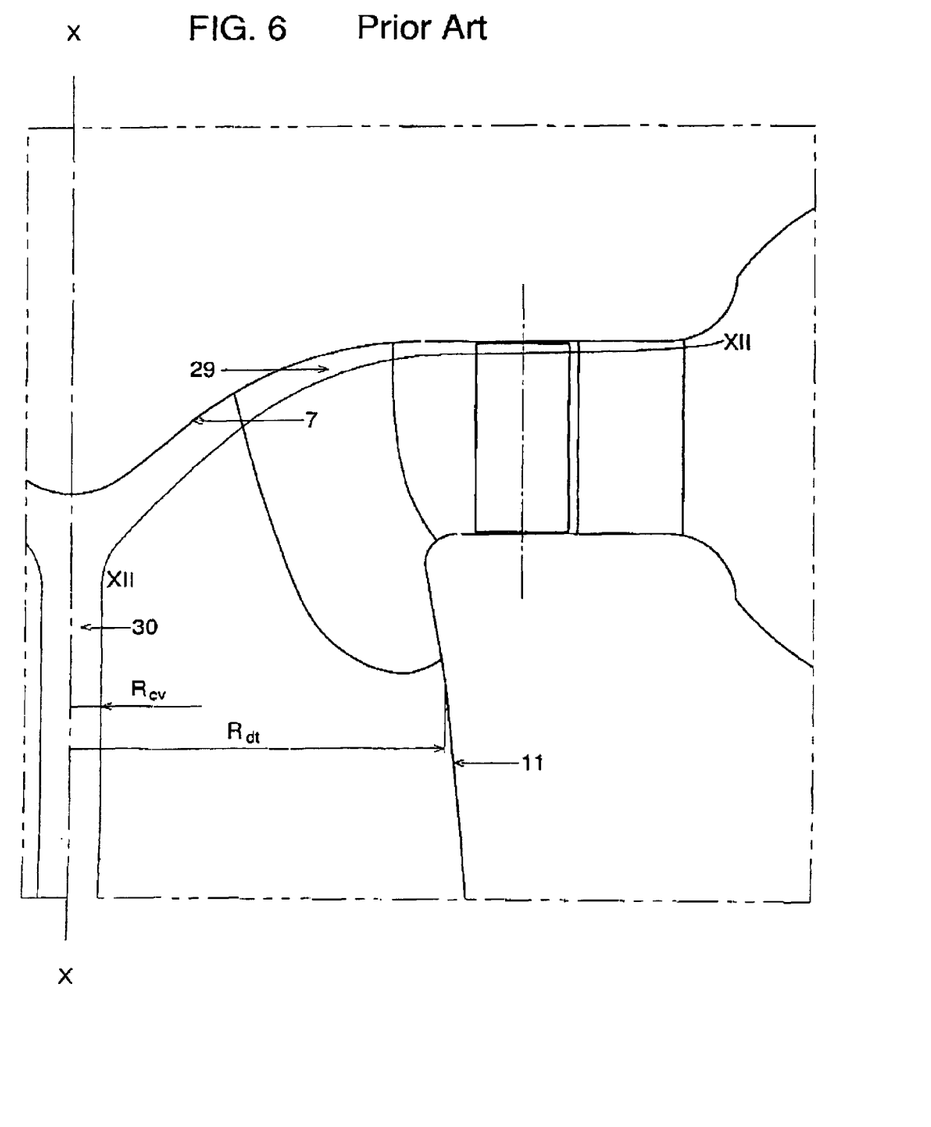
FIG. 6 is an elevation view of water passages of a radial intake turbine with a mixed flow runner without an exit stay apparatus showing leading and trailing edges of the runner blades, the elementary turbine at the runner crown and the axial circular vortex core with its radius, also the radius of the draft tube cone inlet.

FIG. 6 shows an elevation view of water passages of a radial intake turbine with a mixed flow runner and without an exit stay apparatus. FIG. 6 shows a stream surface XII—XII. The stream surface XII—XII together with the crown stream surface bounds the crown elementary turbine 29. In operating regimes other than optimum elementary turbine 29 forms an axial circular vortex core 30 trailing at the tip of the crown 7 of FIGS. 1 and 6 (in this case not truncated). FIG. 6 also shows the radius of the axial circular vortex core 30 and the radius at the inlet to the draft tube cone 11 of FIGS. 1 and 6, denoted $R_{cv}$ and $R_{dt}$ respectively.

Figure 7:
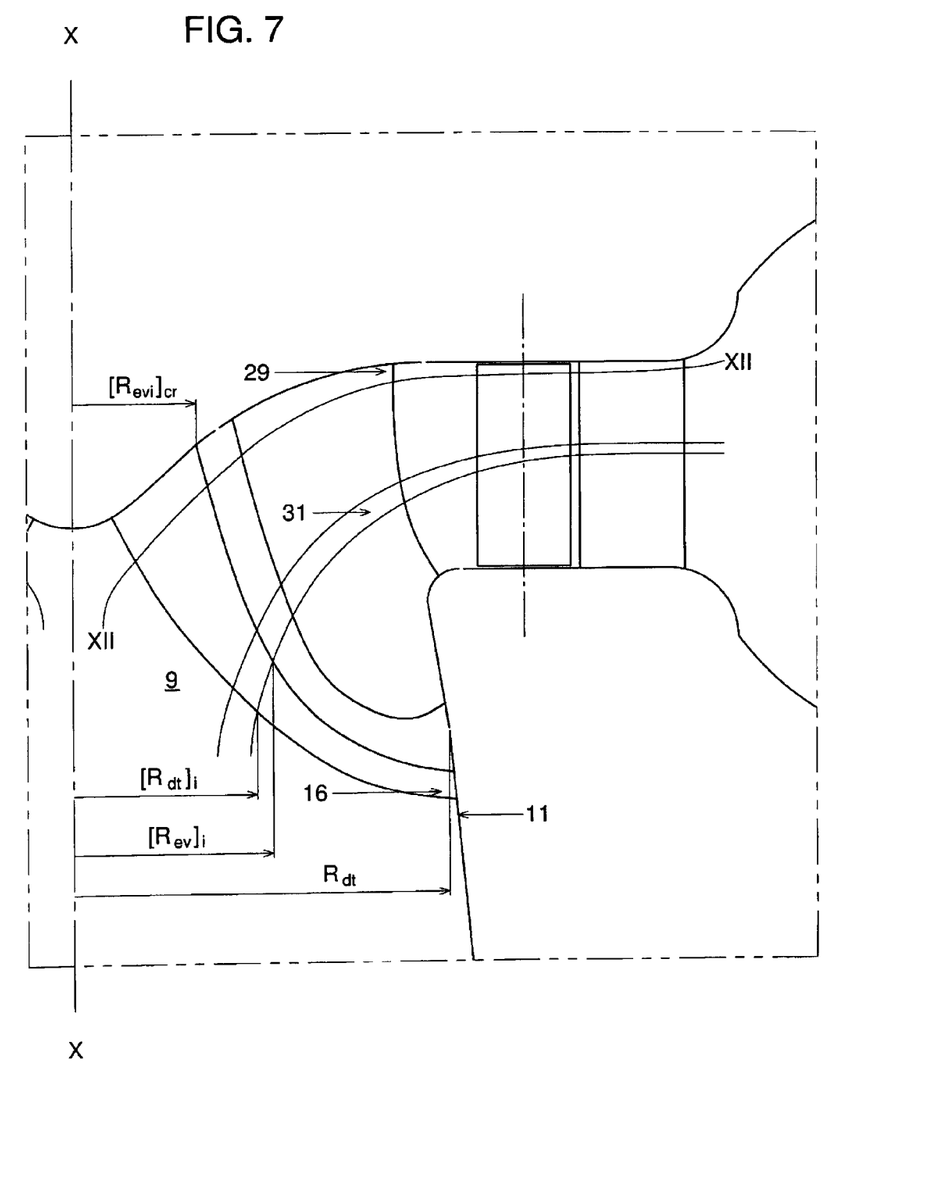
FIG. 7 is an elevation view of water passages of a radial intake turbine with a mixed flow runner and an exit stay apparatus showing leading and trailing edges of the runner blades and of the exit stay vanes, also showing the elementary turbine at the runner crown with radius of inlet to the exit stay vane, and the radius of the draft tube cone inlet.

FIG. 7 shows an elevation view of water passages of a radial intake turbine with a mixed flow runner and an exit stay apparatus 9. FIG. 7 shows a stream surface XII—XII. The stream surface XII—XII together with the crown stream surface bounds the crown elementary turbine 29. For a turbine without an exit stay apparatus an axial circular vortex core 30 of FIG. 6 is formed in the crown elementary turbine 29. FIG. 7 also shows the radius $(R_{evi})_{cr}$ of the inlet exit stay vanes 16 inside the crown elementary turbine 29 and the radius $R_{dt}$ at the inlet to the draft tube cone 11 of FIGS. 1 and 7. Further, FIG. 7 also shows an i-th elementary turbine 31 inside the turbine water passages with its radii at the inlet to the exit stay vanes 16 and at the inlet to the draft tube cone 11, denoted $(R_{ev})_i$ and $(R_{dt})_i$ respectively.

The exit stay vanes 16 of FIGS. 1 and 2 are evenly distributed in space, are identical in shape and all are secured to exit stay flange 17. However in a case of fish friendly turbine the exit stay vanes form an additional obstacle for the passing fish. In this case it is better to have some stay vanes to be secured only to exit stay crown 15 and passing only after the crown part of blades, therefore, creating the obstacle for the fish only at the at the crown part of turbine flow where velocity is substantially smaller than at periphery. These shortened exit stay vanes will help to the cascades after the crown elementary turbine to reach solidity, $(L/T)_{ev} >1.1$, and to decrease the number of exit stay vanes at periphery where the major part of the flow is passing and velocities are higher. The tips of the shortened exit stay vanes must be of the shape similar to the ship screw tips in order to reduce losses caused by vortices leaving the tips.

In the following analysis two turbines are compared: one with and one without an exit stay apparatus 9 of FIGS. 1 and 7. The two turbines under consideration are identical from a fluid-mechanical point of view, except that one has exit stay vanes 16 of FIGS. 1 and 7 and the other does not. Specifically, both turbines have the same geometry of the water passages, wicket gates 5, turbine blades 13, and draft tube 10 of FIG. 1. The particular parameters, shared by both turbines, are those of the Potential Flow turbine designed for the Boundary plant (without an exit stay apparatus).

Total relative head losses $\Delta \zeta_t$ can be computed by combining the relative head losses for elementary turbines $\Delta \zeta_{et}$ using the following formula:

$$\Delta \zeta_t = \frac{1}{Q_t} \sum_{i=1}^{I} (\Delta \zeta_{et})_i \Delta q_i \quad (12)$$

where:
- $(\Delta \zeta_{et})_i$ denotes the relative head losses for the i-th elementary turbine,
- $\Delta_i$ is the flow rate through the i-th elementary turbine, and
- I is the total number of elementary turbines.

There are two types of head losses due the presence of exit stay vanes 16: shock losses $\Delta H_{si}$ at the inlet to the vane and friction losses $\Delta H_{fi}$ along vane surface. Relative friction losses along a profile of length $L_{pr}$ are given by the following formulae (see T. Schlichting, *boundary Layer Theory*, McGraw-Hill [1979]):

$$\Delta \zeta_{fl} = \frac{\lambda_R L_{pr} V_{av}^2}{2g D_r H_t} \quad (13)$$

$$\lambda_R^{-0.5} = 2.0 \ln (\text{Re}\lambda_R^{0.5}) - 0.8 \quad (14)$$

where:
- $V_{av}$ is the average velocity along the profile, and
- $\text{Re} = V_{av} D_r / \lambda_R$ is the Reynolds number.

For the Boundary turbine relative friction losses for the crown profiles 24 and the peripheral profiles 22 of FIG. 2 have the following values;

$(\Delta \zeta_{fl})_{cr} = 0.00044$ $(\Delta \zeta_{fl})_{pe} = 0.00007$

Noting that most of the flow passes through peripheral elementary turbines, one can see from (12) that relative friction losses of turbine head caused by the exit stay vanes 16 are negligible (<<0.1%). Thus, for the purposes of this analysis it is sufficient to compare shock losses of head at the inlet to the stay vanes 16 of FIG. 7 to losses caused by the axial circular vortex core 30 of FIG. 6.

Relative shock losses of head $\Delta \zeta_{si}$ at the inlet to the exit stay vanes 16 for the elementary turbine 31 are given by the following formula (see G. I. Topazh, *Computation of Integral Hydraulic Indicators for Hydromachines*, Leningrad [1989]):

$$\Delta \zeta_{sl} = \frac{K_s (V_u^+ - V_u^-)^2}{2g H_t} \quad (15)$$

where $V_u^+$ and $V_u^-$ are the values of $V_u$ before and after the inlet to the exit stay vanes 16 and $K_s$ is a constant, which depends on the solidity $(L/T)_{ev}$ of the exit stay vanes 16. If $(L/T)_{ev} > 1.1$, then $K_s < 1.0$ and $K_s \approx 1.0$, while if $(L/T)_{ev} < 0.1$, then $K_s \approx 0.0$.

In the optimum operating regime the shock loss of head $(\Delta H_{sl})_{et}$ at the inlet to the exit stay vanes 16 vanishes for all elementary turbines along the span of exit stay vanes 16, because $V_u^+ = V_u^- = (V_u R)_2 / R_{evi}$. Therefore, in the optimum operating regime both turbines, which and without the exit stay apparatus 9, have practically the same efficiency.

In operating regimes other than optimum the turbine of FIG. 6 without the exit stay apparatus 9 of FIG. 7 has an axial circular vortex core 30. This causes a loss of efficiency given by (6). In addition, there are loses of kinetic energy due to the ultimate dissipation of the exit whirl $(V_uR)_2$ at the inlet to the draft cone 11. The turbine with the exit stay apparatus 9 of FIG. 7 does not have an axial circular vortex core and a corresponding loss of efficiency. However, in contrast to the turbine without the exit stay apparatus 9, there are relative head shock losses at the inlet to the exit stay vanes 16 inside the crown elementary turbine 29. Using (15) and taking into account that $V_u^+ - V_u^- = (V_uR)_{2cr}/(R_{evi})_{cr}$, one sees that these losses are given by $$(\Delta \zeta_{sl})_{cr} = \frac{K_{scr}(V_uR)_{2cr}^2}{2g(R_{evi})_{cr}^2 H_t}, \tag{16}$$

There are also shock losses of head at the inlet to exit stay vanes 16 for each i-th elementary turbine 31 in FIG. 7.

Here is a comparison of inlet shock losses with losses of kinetic energy. For each i-th elementary turbine in FIG. 7 $V_u^-$ vanishes, so $$(\Delta \zeta_{sl})_i = \frac{K_{si}(V_uR)_{2i}^2}{2g(R_{ev})_i^2 H_t}. \tag{17}$$

Meanwhile, the kinetic energy losses at the inlet to the draft cone 11 in FIG. 6 are $$(\Delta \zeta_{ke})_i = \frac{(1-K_{si})(V_uR)_{2i}^2}{2g(R_{dt})_i^2 H_t}. \tag{18}$$

As can be seen from FIGS. 1, 6, and 7, for all elementary turbines other than several elementary turbines near the periphery, $(R_{dt})_i < (R_{ev})_i$. Therefore, $(\Delta \zeta_{sl})_i < (\Delta \zeta_{ke})_i$. Elementary turbines near the periphery may be neglected, because the value of solidity there is $(L/T)_{ev} \approx 0.1$, so there is very little interference with the flow.

The above comparison shows that the exit stay apparatus 9 in FIG. 7 partially recovers losses of kinetic energy due to whirl leaving the runner, with the sole exception of the crown elementary turbine 29. Thus, for the purposes of the present analysis, it suffices to compare losses in the crown elementary turbine 29 of FIG. 7 (i=1) to losses caused by the axial circular vortex core 30 of FIG. 6. Using (12) and (16) and assuming $(\Delta \zeta_{sl})_i = 0$ for i=2, . . . I, one obtains the loss of efficiency caused by exit stay vanes 16 of FIG. 7:

$$\Delta \eta_{ev} = \frac{K_{scr}(V_uR)_{2cr}^2 \Delta q_{cr}}{2gQt(R_{evi})_{cr}^2 H_t} \tag{19}$$

Assuming $(K_s)_{cr} = 1.0$ and taking into account $Q_t = \pi(R_{dt})^2 (V_z)_{dt}$ and $\Delta q_{cr} = \pi(R_{cv})^2(V_z)_{dt}$, where $(V_z)_{dt}$ is the axial component of velocity at the inlet to draft tube cone 11 of FIG. 1, gives $$\Delta \eta_{ev} = \frac{(V_uR)_{2cr}^2 R_{cv}^2}{2gR_{dt}^2 H_t(R_{evi})_{cr}^2} \tag{20}$$

Using (6) and (20) one can compare losses $\Delta \eta_{cv}$ in FIG. 6 to $\Delta \eta_{ev}$ in FIG. 7:

$$\Delta \eta_{ev} = \Delta \eta_{cv} \frac{R_{cv}^2}{(R_{evi})_{cr}^2}. \tag{21}$$

If the inlet to the crown elementary turbine 29 of FIG. 7 is not far from the trailing edge of turbine blades 13 of FIG. 1, then it can be safely assumed that $R_{cv} < 0.1 (R_{evi})_{cr}$. Thus, in operating regimes other than optimum, the exit stay apparatus recovers more than 99.0% of efficiency loss due to the axial circular vortex.

In the particular example of Boundary potential flow turbine the recovery of efficiency by the exit stay apparatus amounts to $\Delta(\eta)_t = 8.0\%$ for $Q_{11} = 0.50 (Q_{11})_{opt}$ and $N_{11} = 1.10 (N_{11})_{opt}$.

For a conventional turbine with a mixed flow runner and properly designed draft tube elbow the exit stay apparatus will increase efficiency even in the optimum regime and will recover a larger value of $\Delta(\eta)_t$ in regimes other than optimum. In the optimum regime the exit stay vanes do not cause shock losses at the inlet and recover the losses of kinetic energy in all elementary turbines other than the crown elementary turbine given by $$(\Delta \zeta_{ke})_i = \frac{(1-K_{si})[(V_uR)_{2i}]_{opt}^2}{2g(R_{dt})_i^2 H_t}. \tag{22}$$

In regimes other than optimum, for the i-th elementary turbine of FIG. 7 the shock losses at the inlet to the exit stay vanes 16 are $$(\Delta \zeta_{sl})_i = \frac{K_{si}\{(V_uR)_{2i} - [(V_uR)_{2i}]_{opt}\}^2}{2g(R_{ev})_i^2 H_t}. \tag{23}$$

Meanwhile, the losses of kinetic energy for every elementary #i at the inlet to draft cone 11 in FIG. 6 are defined by the formula (18). Comparing (23) to the formula (18) for the losses of kinetic energy for each i-th elementary turbine at the inlet to the draft cone 11 in FIG. 6 one sees that for a conventional turbine the value of $(\Delta \zeta_{sl})_i$ is much smaller than value of $(\Delta \zeta_{ke})_i$.

I claim:

1. A reaction hydraulic turbine having a guide gate apparatus, a shaft, a runner apparatus secured to said shaft, an exit stay apparatus, and a draft tube with a draft tube cone;

said guide gate apparatus having a plurality of wicket gates arranged in a circular array around a central axis with said gates pivotal about pivot axes parallel to said central axis;

said runner apparatus having a plurality of runner blades arranged in a circular array around said central axis and a runner crown with said runner blades secured to said runner crown;

and said exit stay apparatus having an exit stay crown located immediately under said runner crown, which said exit stay crown together with said runner crown forms water passages at said runner apparatus exit, and said exit stay apparatus further having a plurality of exit stay vanes arranged in a circular array around said central axis with said exit stay vanes secured to said exit stay crown;

said exit stay vanes crossing water passages from said exit stay crown to the periphery, so that the entire flow of the water through said reaction hydraulic turbine must pass through the channels formed by said exit stay vanes;

said exit stay vanes are secured at the periphery and, therefore, said exit stay crown is supported by said exit stay vanes below said runner crown;

said exit stay crown does not touch other parts of said reaction hydraulic turbine besides said exit stay vanes;

and said draft tube cone forming water passages having no solid bodies inside so that the water flow in said draft tube cone after said exit stay apparatus touches no solid surfaces besides said draft tube cone.

2. A reaction hydraulic turbine claim 1 further having a spiral casing, an inlet stay ring with inlet stay vanes, and a discharge ring;

said spiral casing and said inlet stay ring being secured to said discharge ring;

said runner crown being truncated by a plane perpendicular to said central axis below said runner blade exit at said runner crown.

3. A reaction hydraulic turbine of claim 2 wherein said exit stay vanes are secured to draft tube cone at the periphery.

4. A reaction hydraulic turbine of claim 2 wherein said exit stay apparatus has an exit stay flange at the periphery with said exit stay vanes secured to said exit stay flange.

5. A reaction hydraulic turbine of claim 4 wherein said exit stay flange secured to said discharge range and to said draft tube cone.

6. A reaction hydraulic tube in of claim 1 wherein said runner apparatus is a mixed flow runner.

7. A reaction hydraulic turbine of claim 1 wherein said runner apparatus is an axial flow runner.

8. A reaction hydraulic turbine of claim 1 wherein said runner apparatus comprises a runner rim with said runner blades secured to said runner rim.

9. A reaction hydraulic turbine of claim 1 wherein said exit stay vanes are identical in shape, are evenly distributed in the space around said exit stay crown, and the solidity of the cascade formed by said exit stay vane profiles at said exit stay crown is $(L)_{cr}/(T)_{cr} > 1.1$, were $(L)_{cr}$ is the length of said exit vane crown profile and $(T)_{cr}$ is the maximum distance between adjacent said exit vane crown profiles along the circumference.

10. A reaction hydraulic turbine of claim 9 wherein said exit stay vanes along leading edges each having an inlet angle, $\beta_i$, wherein $$\tan\beta_i = \frac{(V_m)_{opt}}{(V_u)_{opt}}$$

where $(V_m)_{opt}$ and $(V_u)_{opt}$ are the meridional and circumferential components of absolute velocity along said exit stay vane leading edge in the optimum regime.

11. A reaction hydraulic turbine of claim 10 wherein said exit stay vanes along trailing edges each having an exit angle $\beta_e = 90°$.

12. A reaction hydraulic turbine of claim 10 wherein said exit stay vanes at exit edges periphery each having an exit angle, $\beta_{cp}$, wherein:

$$\tan\beta_{cp} = \frac{[(V_m)_{opt}]_p}{[(V_u)_{opt}]_p}$$

where $[(V_m)_{opt}]_p$ and $[(V_u)_{opt}]_p$ are the meridional and circumferential components of absolute velocity in the optimum regime at location of said exit stay vane exit edge periphery in the turbine without said exit stay apparatus.

13. A reaction hydraulic turbine of claim 12 wherein said exit stay vanes along exit edges each having an exit angle gradually changing along vane span from 90° at said stay crown to $\beta_{ep}$ at periphery.

14. An exit stay apparatus for installation into a reaction hydraulic turbine, which has runner apparatus with runner blades secured to the runner crown, truncated at the bottom, and the draft tube cone, comprising an exit stay crown and a plurality of exit stay vanes arranged in a circular array around a central axis with said exit stay vanes secured to said exit stay crown;

and when installed into said reaction hydraulic turbine;

said exit stay crown is located immediately under said runner crown, which said exit stay crown together with said runner crown forms water passages at said runner apparatus exit;

said exit stay vanes cross water passages from said exit stay crown to the periphery, so that the entire flow of the water through said reaction hydraulic turbine must pass through the channels formed by said exit stay vanes;

said exit stay vanes are secured at the periphery and, therefore, said exit stay crown is supported by said exit stay vanes below said runner crown;

said exit stay crown does not touch other parts of said reaction hydraulic turbine besides said exit stay vanes.

15. An exit stay apparatus for a reaction hydraulic turbine of claim 14 wherein said exit stay crown has a flat top.

16. An exit stay apparatus for a reaction hydraulic turbine of claim 15 wherein said exit stay crown is shaped as a cup.

17. An exit stay apparatus for a reaction hydraulic turbine of claim 14 wherein said exit stay vanes are identical in shape, are evenly distributed around said exit stay crown, and the solidity of the cascades formed by profiles of said exit stay vanes L/T, where L is the length of said exit vane profile and T is the maximum distance between adjacent profiles along circumference, changes its value from larger than 1.1 at said exit stay crown to a small value, between 0.1 and 0.2, at the apparatus periphery.

18. An exit stay apparatus for a reaction hydraulic turbine of claim 14 wherein said exit stay apparatus has an exit stay flange at the apparatus periphery with said exit stay vanes secured to said exit stay flange.

19. An exit stay apparatus for a reaction hydraulic turbine of claim 14 wherein said exit stay apparatus has an exit stay flange at the apparatus periphery with said exit stay vanes comprising first vanes and second vanes, said second vanes being shorter then said first vanes, wherein the first vanes being secured to said exit stay flange and said second vanes being secured only to said exit stay crown.

* * * * *